W. P. JONES.
Churn.
No. 168,748.            Patented Oct. 11, 1875.
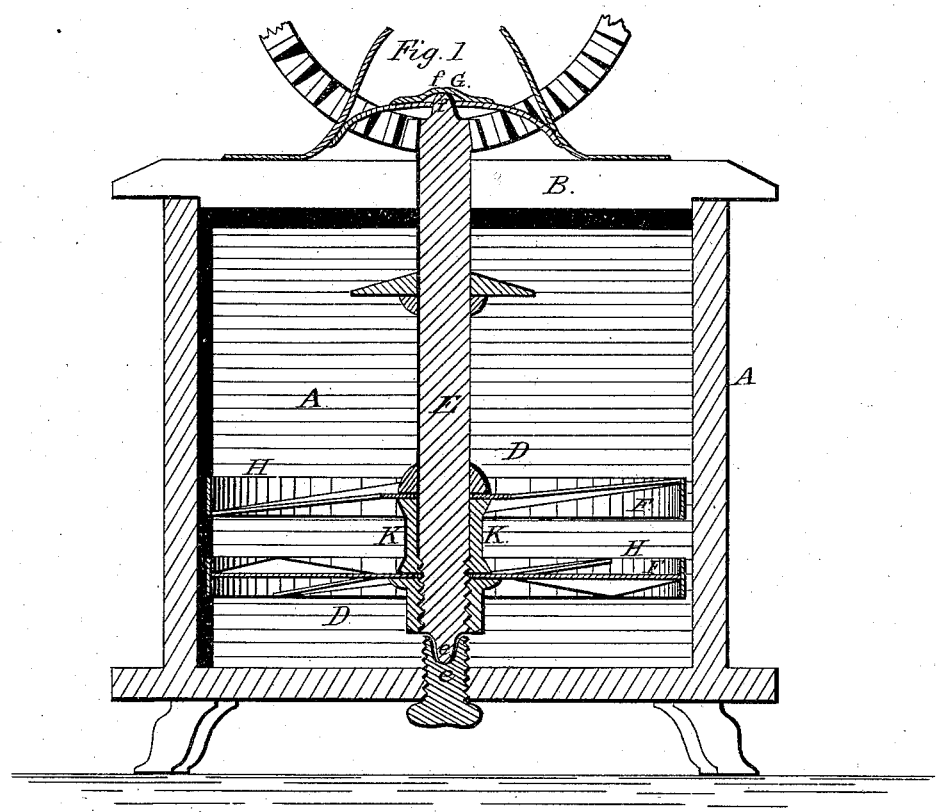
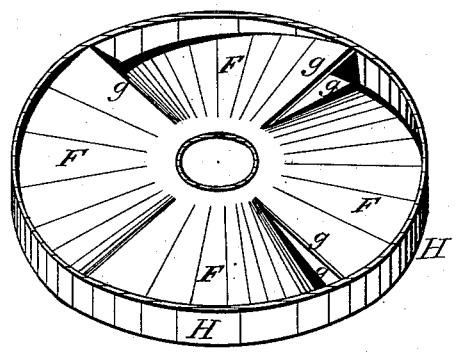
Attest:
Wm Bagger
M. T. Halleck
Inventor:
Wm. P. Jones,
by Louis Bagger
Atty.

UNITED STATES PATENT OFFICE.

WILLIAM P. JONES, OF CLIO, IOWA.

IMPROVEMENT IN CHURNS.

Specification forming part of Letters Patent No. 168,748, dated October 11, 1875; application filed August 21, 1875.

*To all whom it may concern:*

Be it known that I, WILLIAM P. JONES, of Clio, in the county of Wayne and State of Iowa, have invented certain new and useful Improvements in Churns; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1 is a vertical section of my improved churn, and Fig. 2 is a perspective view of a dasher detached from the churn.

Similar letters of reference indicate corresponding parts.

The object of my invention is to produce a dasher that will act as a cutter, agitator, and presser combined, and which, therefore, although easy to operate, makes it possible to produce butter in less time than with the dashers now commonly used.

In the drawing, A is the box, the cover of which I make in two halves or sections. The gearing by which the agitator D is operated I place upon one of the sections only, (B in the drawing,) so as to admit of the ready removal of the other section whenever it is found desirable to inspect the contents of the box. The covers may be fastened onto the box by screws, clamps, or any other suitable devices. The dasher D consists of a central rotating shaft, E, having the flaps F. The shaft E has its bearings in the gudgeon $e$ in the bottom of the box A, and at $f$ in the standard G. The flaps F, which are preferably made of sheet metal, consist of circular plates or disks, slitted open from the periphery toward the central shaft E. Each section or flap is then bent slantingly or obliquely in its relation to the shaft, as shown more clearly in Fig. 2. In order to keep the flaps permanently in this position, and to give additional strength to the disks, a flange or rim, H, may be soldered or otherwise secured along the edge of the disk. The disks forming the flaps F are adjusted to the shaft E concentrically, at a suitable distance from each other, by interposing tubular washers K, which may be varied in length according to the distance it is desired to have the disks apart.

The mode of using my improved churn will be readily understood from the foregoing description. The dasher is inserted into the box A, which has been previously filled with cream. The two covers are then secured to the box, and the dasher is adjusted in its bearings; it may then be operated by turning the crank.

The principal advantages of a dasher constructed as hereinbefore set forth are, first, that it is easy to operate, and may be operated at a great rate of speed with the application of comparatively little force; second, that it will "cut" the cream and butter as it is being formed by the cutting-edges $g$, so as to more thoroughly intermix the contents of the box; and, third, that it will screw or press in a downward direction toward the bottom of the box (owing to the propeller-shaped conformation of the horizontally-arranged disks) the butter as it is being formed, thereby tending to compress the particles of new butter.

Having thus described my invention, I claim and desire to secure by Letters Patent of the United States—

The combination of the perforated propeller-wheels D, constructed as described, with the central shaft E and adjustable thimbles K, as and for the purpose herein set forth.

In testimony that I claim the foregoing as my own, I have hereunto affixed my signature in presence of two witnesses.

WILLIAM P. JONES.

Witnesses:
LEWIS F. KENTCH,
L. W. VOWELL.